Aug. 12, 1924.                                                    1,504,486
R. D. LANE
VEHICLE CURTAIN FASTENER
Filed July 24, 1923
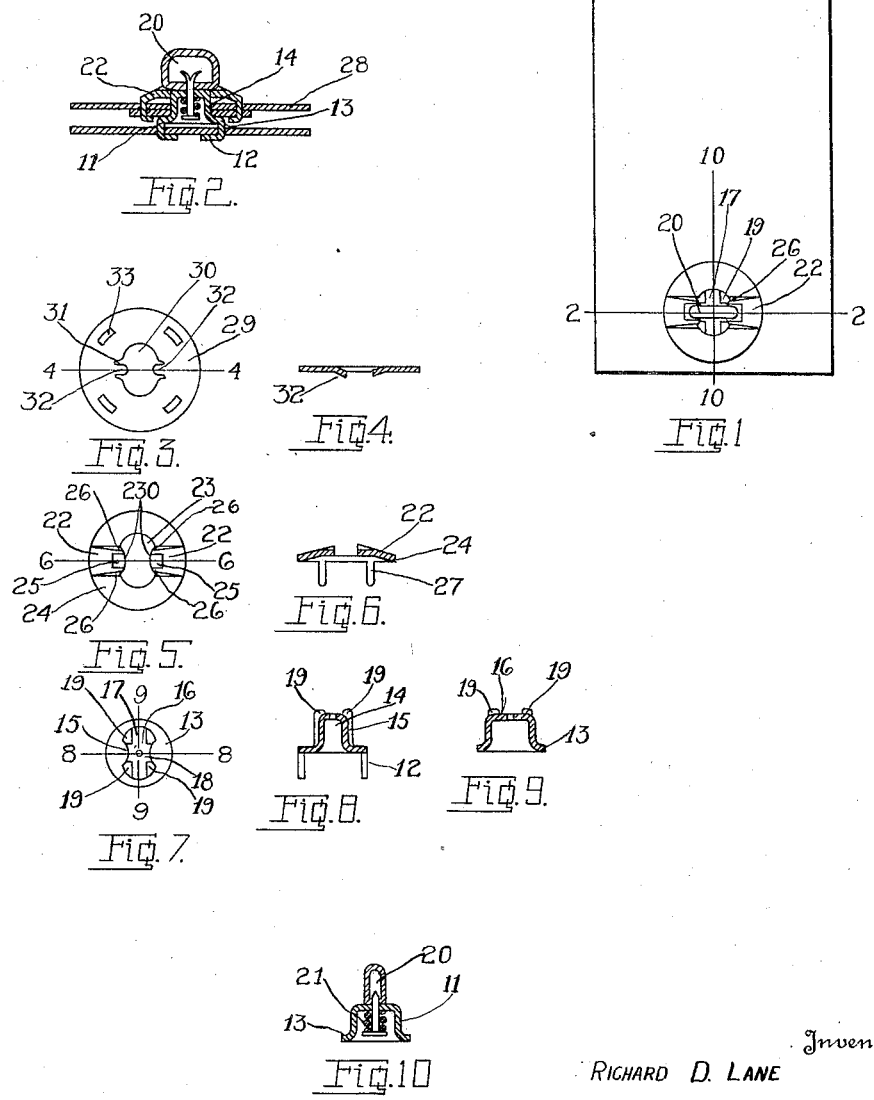
Inventor
RICHARD D. LANE
By Walter F. Murray
Attorney Patented Aug. 12, 1924.

1,504,486

UNITED STATES PATENT OFFICE.

RICHARD D. LANE, OF AUGUSTA, KENTUCKY, ASSIGNOR TO THE F. A. NEIDER COMPANY, OF AUGUSTA, KENTUCKY, A CORPORATION OF KENTUCKY.

VEHICLE CURTAIN FASTENER.

Application filed July 24, 1923. Serial No. 653,592.

*To all whom it may concern:*

Be it known that I, RICHARD D. LANE, a citizen of the United States of America, and a resident of Augusta, in the county of Bracken and State of Kentucky, have invented new and useful Improvements in a Vehicle Curtain Fastener, of which the following is a specification.

This invention relates to improvements in vehicle curtain fasteners and curtain eyelets. Numerous attempts have been made to overcome various objections in curtain fasteners.

An object of my invention is to provide a vehicle curtain fastener and eyelet therefor, that will positively lock the curtain to the vehicle.

Another object is to provide a device of this kind that will not rattle or wobble.

Another object is to provide a device of this kind which may be simply and economically made.

Fig. 1 is a top plan view of a turn button and eyelet of my invention, assembled upon a curtain.

Fig. 2 is a cross sectional elevation on line 2—2 of Fig. 1.

Fig. 3 is a plan view of the lower plate or washer of my invention.

Fig. 4 is a cross section on line 4—4 of Fig. 3.

Fig. 5 is a plan view of the upper plate or eyelet of my device.

Fig. 6 is a cross section taken on line 6—6 of Fig. 5.

Fig. 7 is a top view of the base.

Fig. 8 is a cross sectional view on line 8—8 of Fig. 7.

Fig. 9 is a cross sectional view on line 9—9 of Fig. 7.

Fig. 10 is a cross section of the base taken on line 10—10 of Fig. 1.

The device comprises a base 11 having means to secure it upon a vehicle body, such means being lugs 12 or any other usual fastening means. The base 11 comprises a flanged portion 13 and a shank 14, which is of an oval shape having concave depressions 15 in its opposed major sides. The top 16 of the shank has flat ways 17 and 18 extending across it in the direction of its major and minor axis respectively, whereby bosses 19 are formed at intervals about the edge of the top 16. The turn button 20 is of the usual type, being swiveled centrally on the top 16 and having the usual compression spring 21 to yieldingly retain it in contact with the top.

The curtain eyelets which form part of my invention are made in two parts, one part being disposed upon the outer side of a vehicle curtain and the other upon the inner side thereof. The outer eyelet 24 may be circular in form and have raised portions or bosses 22 disposed on the opposite sides of the perforation 23, which perforation is of the same shape as the top of the shank 14 of the base, namely, an oval having concave major sides. Thus, there are formed ears 230 extending into the perforation 23, the ears having the same shape as the depression 15 in the shank 14. The bosses 22 are tapered toward the outer edges of the eyelet 24 and have depressions or ways 25 extending longitudinally thereof. This structure forms knobs 26 at the corners of the bosses 22, adjacent the perforation 23. The eyelets 24 are provided with tongues 27 for securing the same upon the curtain 28 and the washer. The inner eyelet or washer 29 is of the same general outline as the eyelet 24. From the perforation 30, however, are slots 31 extending into the washer 29 as shown in Fig. 3, whereby spring lips 32 are formed, the lips 32 being outwardly struck and curved, to provide a spring tension, the purpose of which will be set forth later.

Suitable slots 33 are formed in the washer 29 and coincide with the tongues 27 of the eyelet 24, whereby these two parts may have the curtain clamped between them. In operation the base 11 is mounted upon a vehicle and the eyelet 24 and washer 29 are secured upon opposite sides of the curtain 28, so that the shank may pass through the perforations 23 and 30 respectively of the eyelet and washer and through a coinciding perforation in the curtain between them. At this time the turn button 20 extends in the direction of the major axis of the top 16 of the shank. The spring lips 32 of the washer 29 and the ears 230 of the eyelet 24 extend into the depressions 15 of the shank 14, so that the curtain and eyelet snugly fit around the shank 14. The spring lips 32 seat upon the flange 13 adjacent the shank 14. The turn button 20 is then turned and rides over the bosses 19 on the top 16 of the shank and onto knobs 26 of the eyelet 24. This action compresses the spring lips 32 against the flange 13. As the button 20 is turned farther it is permitted to seat in the ways 18 on the top 16 of the shank and ways 25 on eyelet 24, where it is firmly held. The action of the spring lips 32 having exhausted practically all of the tension of the spring 21 of the turn button, the curtain and eyelet are firmly secured between the button 20 and the flange 13. Thus, it will be seen that the curtain is firmly secured against slidable motion and rotary motion on the shank, as the eyelet and washer fit snugly around the shank whereby turning is prevented and the button 20 is firmly seated in the ways 18 on the shank and the ways 25 on the eyelet, whereby it is firmly held against slidable motion under the action of the spring lips 32 of the washer.

What I claim is:

1. In a device of the class described, the combination with a vehicle curtain fastener, comprising a shank having depressions in the sides thereof, of an eyelet and a washer adapted to be secured on opposite sides of a curtain, said eyelet, washer and curtain having substantially coinciding perforations therethru, ears and spring lips on the eyelet and washer respectively, extending into the perforations therein, the shank slidably engaging the walls of the perforations and cooperating means on the shank and eyelet for removably and rigidly securing the curtain to the shank against the yielding resistance of the spring lips.

2. In a certain fastening device, the combination of a shank having depressions in the opposite walls thereof, an eyelet and washer for mounting on opposite sides of a curtain, and having perforations therethru, ears on the eyelets, spring lips on the washer, the walls of the perforations slidably engaging the walls of the shank the ears and spring lips seating in the depressions in the shank and cooperating means on the shank and eyelet for rigidly securing the curtain against separation from the shank.

3. In a device of the class described, the combination of a shank having depressions in the walls thereof, an eyelet and washer having perforations therethru, ears and lips on said eyelet and washer respectively, extending into the perforations therein, the eyelet and washer being mounted on the opposite sides of the curtain, the shank slidably engaging the walls of the perforations, the ears and lips extending into the depressions in the shank, means on the shank and eyelet cooperating with the washer for rigidly and removably mounting the curtain on the shank and means for mounting the shank upon a vehicle.

4. In a device of the class described, the combination of a fastener, comprising a shank having a base, a turn-button revolubly mounted on the shank, normally in a position wherein the body of the turn-button will lie within the lines of the shank and for being turned from its normal position for assuming an abnormal position, wherein the body of the turn-button will extend beyond the lines of the shank, an eyelet and a washer mounted on a curtain, spring lips on the washer, said eyelet, washer and curtain having substantially coinciding perforations therethru for slidably engaging the shank and means on the eyelet and shank for locking the curtain to the shank against the pressure of the spring lips of the washer upon the base.

5. In a fastening device, the combination of a shank, a turn-button rotatably mounted upon the shank for assuming an inoperative position within the body lines of the shank, and an operative position extending beyond the body lines of the shank, an eyelet and washer having coinciding perforations therethrough, the walls of the perforations slidably engaging the walls of the shank and cooperating means on the shank, eyelet and washer for securing the last mentioned two parts against separation from the shank.

6. In a fastening device of the class described, the combination of a turn-button, a base rotatably supporting the turn-button, an eyelet for movement over the turn-button and a pair of yielding means associated with the eyelet for exerting a yielding pressure on the base and turn-button.

7. In a fastening device of the class described the combination with a turn button and a base, of means for yieldingly retaining the turn button upon the base, an eyelet and washer for movement over the turn button, and means upon the washer for yieldingly binding the eyelet and washer between the base and the turn button.

In testimony whereof, I have hereunto subscribed my name this 21st day of July, 1923.

RICHARD D. LANE.